UNITED STATES PATENT OFFICE.

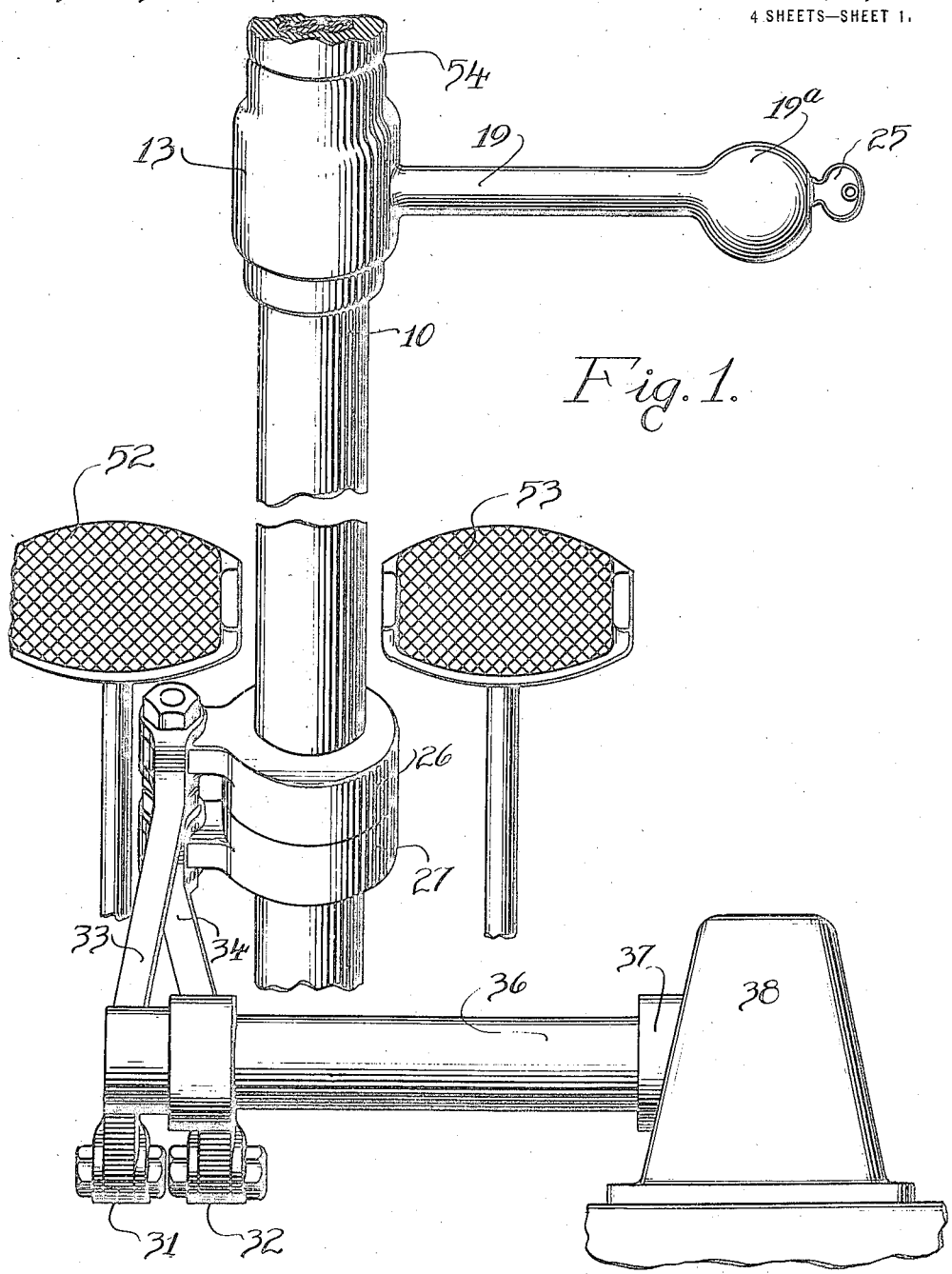

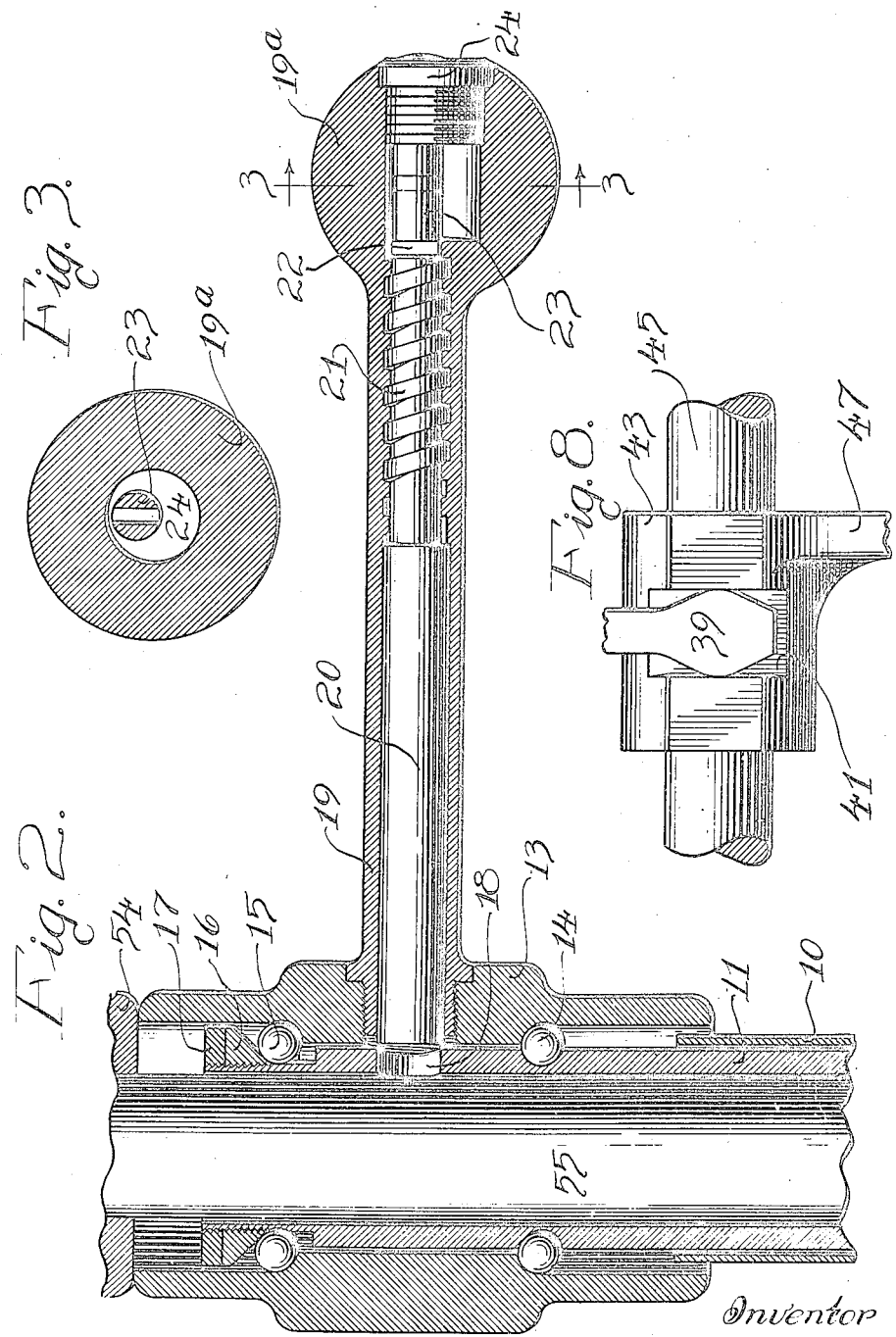

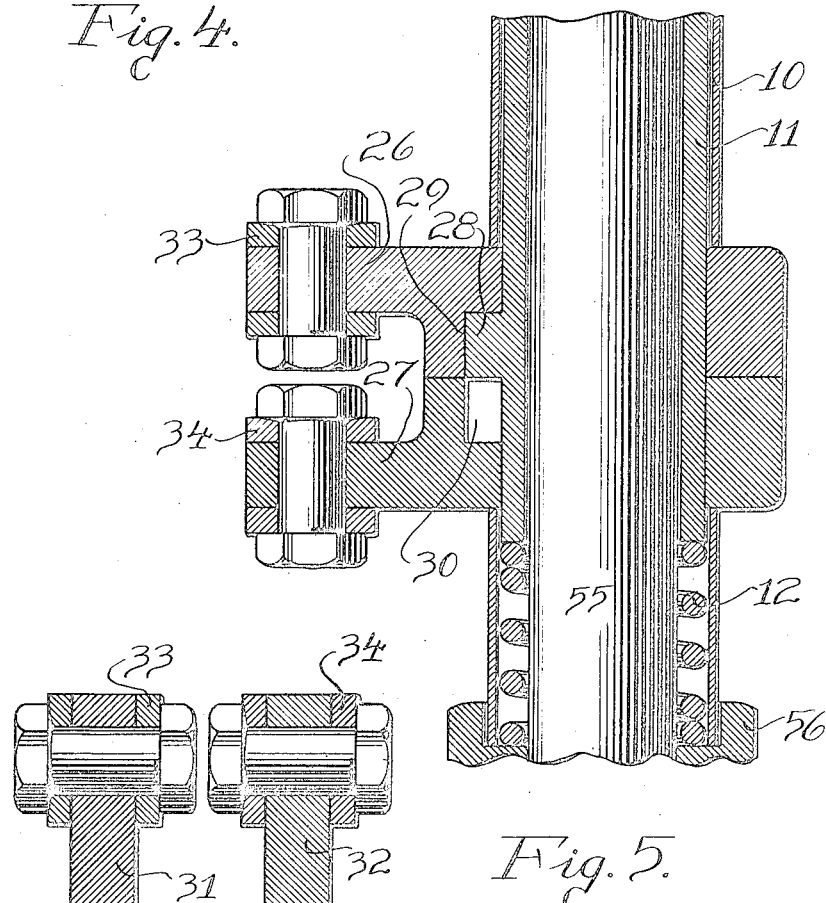
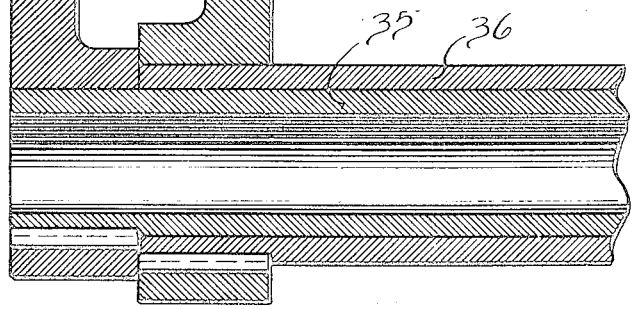

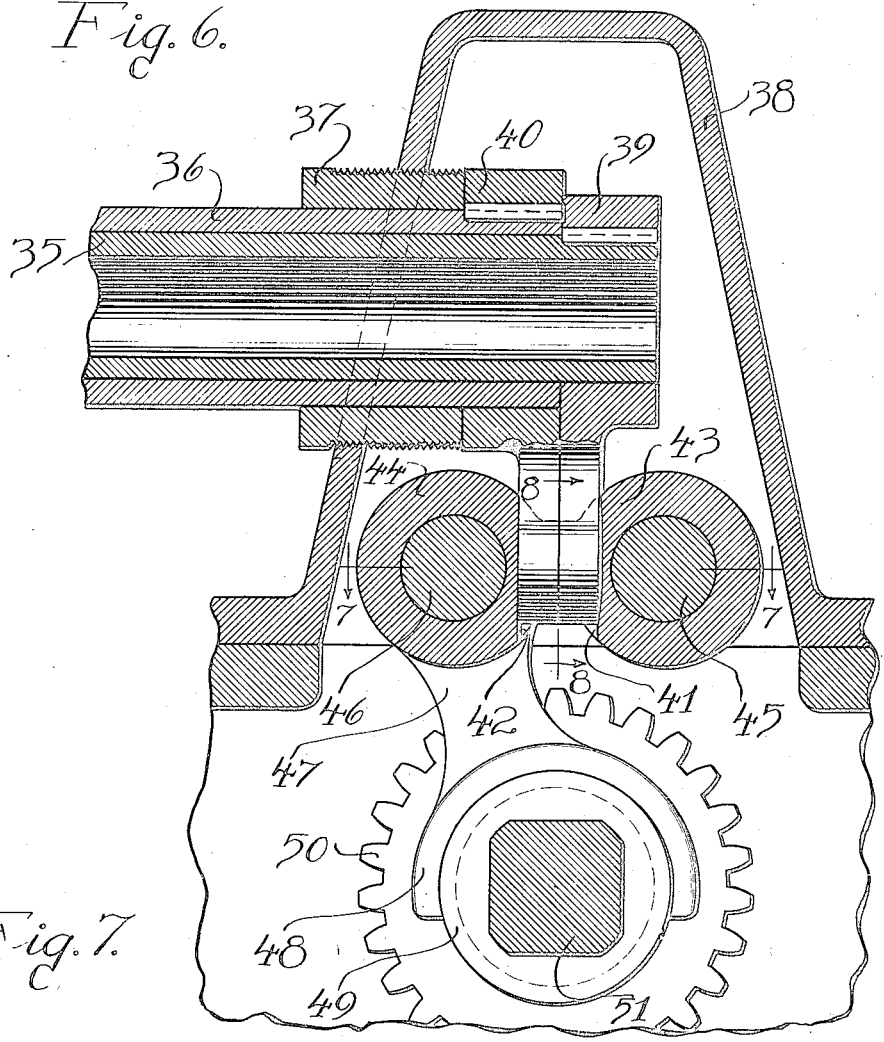
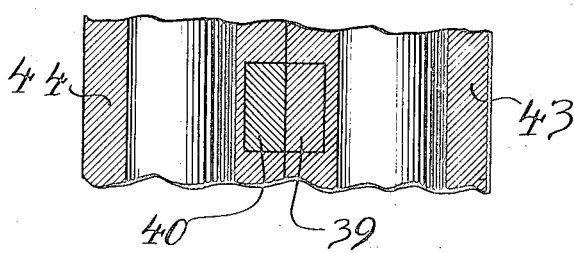

GARRETT W. WOODWARD, OF CHICAGO, ILLINOIS, ASSIGNOR TO WOODWARD AUTOMATIC CONTROL CORPORATION, OF CHICAGO, ILLINOIS, A CORPORATION OF ILLINOIS.

GEAR-SHIFTING MECHANISM.

1,425,227.  Specification of Letters Patent.  Patented Aug. 8, 1922.

Application filed April 21, 1921. Serial No. 463,189.

*To all whom it may concern:*

Be it known that I, GARRETT W. WOODWARD, a citizen of the United States, residing at Chicago, in the county of Cook and State of Illinois, have invented a new and useful Improvement in Gear-Shifting Mechanism, of which the following is a specification.

This invention relates to shifting mechanism for automobile transmissions and the like and is fully described in the following specification and shown in the accompanying drawings in which Figure 1 is a skeleton rear elevation of the mechanism.

Fig. 2 is a longitudinal section through the operating lever and upper end of the steering column;

Fig. 3 is a transverse section on the line 3—3.

Fig. 4 is a longitudinal section through the lower end of the steering column;

Fig. 5 is a vertical longitudinal section on the line 5—5 of Fig. 1, showing the left-hand end of the horizontal sleeves;

Fig. 6 is a similar section on the right-hand end of said sleeves;

Fig. 7 is a horizontal section on the line 7—7 of Fig. 6; and Fig. 8 is a vertical section on the line 8—8 of Fig. 6.

In the embodiment shown this invention is illustrated as applied to a steering column having an outer tube 10 which is supported in the automobile body by brackets (not shown). Inside this tube is mounted a tubular member 11 which is pressed upwardly by means of a coil spring 12 as shown in Figure 4. A member 13 is rotatably mounted upon the upper end of the tube 11 and two rows of balls 14 and 15 are interposed in suitable raceways between the tube 11 and the member 13. A cone 16 is screwed upon the upper end of the tube 11 and adjustably held in place by means of a lock-nut 17.

An opening 18 is formed in the side of the tube 11 and a tubular member 19 is secured to the member 13, the opening in the tubular member registering with the opening 18. A plunger 20 is mounted in the tubular member 19, the outer end of the plunger being threaded at 21 to match similar threads within the outer end of the tubular member 19. The outer end of the plunger terminates in a thin, flat axial lug 22 which is slidably mounted in the slotted member 24 and in alignment with the plunger 20. This plunger is assembled from the opposite end.

When the lock-key 25 is removed the plunger will be turned to the retracted position shown in Figure 2 and the member 13 will be free to move about the tube 11. When the key is inserted and turned the tumbler 23 and the plunger 20 turn with it and the latter is forced inwardly into the opening 18, locking the member 13 and the tube 11 together. In order to do this, it will be necessary, of course, to swing the member 13 until the plunger 20 is in front of the opening 18. It will also be noted that when the parts are assembled and the key removed the plunger 20 will prevent the lock 24 from being removed. In order to remove the lock it is necessary to first remove the plunger 20, when the lock can be unscrewed.

Lever-arms 26 and 27 are journaled on the lower end of the tube 11. A lug 28 is formed upon the side of the tube 11 and is slidably mounted in openings 29 and 30 in the members 26 and 27, respectively. Longitudinal movement is permitted of the tube 11 because of the spring 12.

The lever-arms 26 and 27 are pivotally connected with the lever-arms 31 and 32 by means of links 33 and 34, respectively. The lever-arms 31 and 32 are keyed to the sleeves 35 and 36, respectively, the former sleeve being journaled within the latter which is journaled in the bearing 37, which is carried by the transmission housing 38. Fingers 39 and 40 are keyed to the sleeves 35 and 36, respectively. These fingers slide within slots 41 and 42 in adjacent faces of the blocks 43 and 44, which are carried by the slide rods 45 and 46, respectively. The rod 46 carries an arm 47 which is bifurcated under 48 which engages an annular groove in the hub 49 of the key 50 which is slidably mounted upon the splined shaft 51. In the same way the rod 45 is connected to selective sliding gears (not shown).

It will be understood that the selective sliding gear transmission may be any of the well-known types and that the rods 45 and 46 are substantially the same as those forming part of these well-known transmissions. With these rods in the mid position, the transmission is in neutral. By moving one of the rods, as 45, in one direction, the transmission is shifted to reverse, while an opposite movement of the rod 45 from neutral position throws the transmission into first-speed position. In the same way forward and backward movement of the other rod, as 46, puts the transmission in intermediate and high speeds. Lock means are provided on the rods 45 and 46 to retain the rods in neutral and any other regular operative positions.

When it is desired to shift the gears the key 25 is inserted in the lock and the key turned so as to cause the plunger 20 to lock the lever 19 to the tube 11. Assuming that the first-speed position of the lever 19 when it is at the top of its movement when the tube 11 is held in the position shown in Fig. 4 by the spring 12, and with this lever turned back toward the operator—to shift from neutral to first-speed position, the clutch pedal 52 (Fig. 1) will be depressed, disengaging the clutch, and the lever 19 will be pulled toward the operator as far as it will go. This will cause the lug 28 to move the lever-arm 26, the link 33, the finger 39 and the rod 45 so as to move the gears of the transmission into first-speed position.

In order to shift to intermediate position, it is necessary to again disengage the clutch by means of the clutch pedal 52 and move the lever 19 forward and down. As it comes back to neutral, the tube 11 is forced down, compressing the spring 12. The lug 28 has in the meantime returned the lever-arm 26 to neutral position, and this lug then drops into the notch 30 in the lever-arm 27 and causes it through the intermediate parts to move the gear 50 to a position corresponding to intermediate speed.

To shift the gears into high speed the clutch is again disengaged and the lever 19 is drawn toward the operator.

The brake pedal 53 is also shown in order to indicate its position with relation to the other parts. It will be understood, of course, that the positions indicated are purely relative and that the position of the various parts, in order to obtain different speeds, may be changed to suit the inclinations of the designer. The steering wheel 54 is keyed to the steering shaft 55 which is journaled within the tube 11 and journaled at the bottom in the bearing 56 as shown in Fig. 4.

While I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent is—

1. In combination, a steering column, a member rotatably carried by said column, a selective sliding gear transmission, sliding gears in said transmission, means for selectively operably connecting said gears to said member, a lever for turning said member, and means under control of the operator for connecting said lever to said member and for disconnecting it therefrom.

2. In combination, a steering column, a member rotatably carried by said column, a selective sliding gear transmission, sliding gears in said transmission, means for selectively operably connecting said gears to said member, a lever for turning said member, a plunger in said lever, and a lock operably connected to said plunger for moving it into and out of engagement with said member.

3. In combination, a steering column, a shift lever connected thereto, a member rotatably carried thereby, a lug on said member, two lever-arms journaled on said column, said member being movable longitudinally to cause said lug to selectively engage said lever-arms so that the latter may be moved by said shift lever, a transmission of the selective sliding gear type having gear shift members movable to effect the moving of the transmission gears, and means operatively connecting each of said lever-arms with one of said gear shift members.

4. In combination, a steering column, a shift lever connected thereto, a member rotatably carried thereby, a lug on said member, two lever-arms journaled on said column, said member being movable longitudinally to cause said lug to selectively engage said lever-arms so that the latter may be moved by said shift lever, a transmission of the selective sliding gear type having gear shift members movable each side of neutral to effect the moving of the transmission gears, and means operatively connecting each of said lever-arms with one of said gear shift members.

GARRETT W. WOODWARD.